Figure 1:
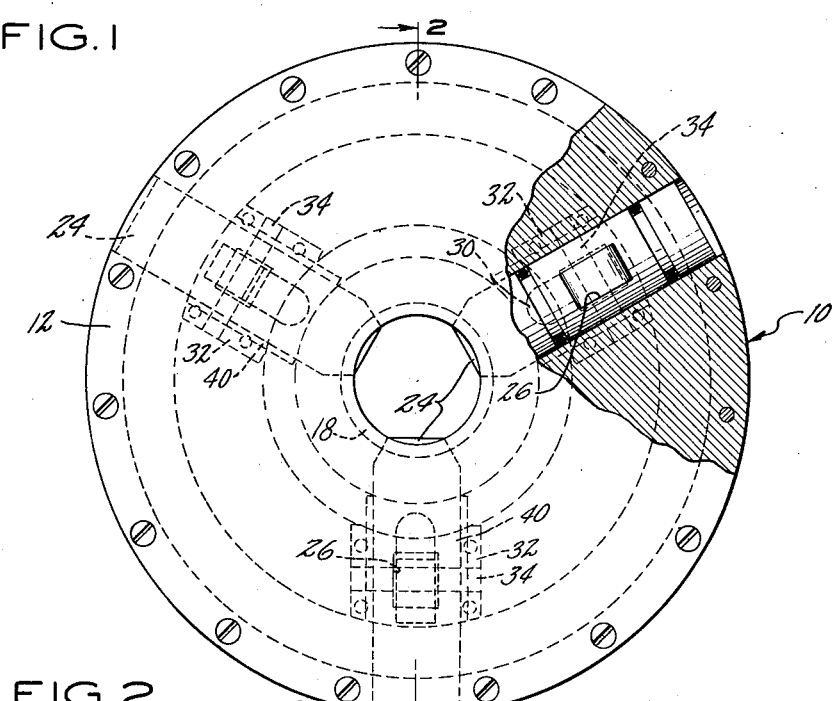

Nov. 23, 1954   E. W. WORK   2,695,176

PNEUMATIC OPERATED CHUCK

Filed Feb. 21, 1952

INVENTOR
ERICH W. WORK
BY Joseph H. Schofield
ATTORNEY

# United States Patent Office 2,695,176
Patented Nov. 23, 1954

2,695,176

PNEUMATIC OPERATED CHUCK

Erich W. Work, New Britain, Conn., assignor to Union Manufacturing Company, New Britain, Conn., a corporation of Connecticut Application February 21, 1952, Serial No. 272,766

10 Claims. (Cl. 279—4)

This invention relates to work holding chucks and more particularly to a chuck having its jaws actuated by pneumatic means.

A primary object of the invention is to provide a chuck of the pneumatic type for mounting on the rotating spindle of a machine tool such as a lathe and in which a cylinder to which air or fluid may be admitted under pressure is provided within the body of the chuck, movement of a piston within the cylinder axially of the chuck being used to radially actuate the chuck jaws.

Another object of the invention is to provide pivotally mounted levers within one of the heads of the cylinder, so that one end of each lever may engage a recess formed in a jaw, the opposite end of each lever slidably engaging within a bearing member housed within the piston so that movement of the piston in opposite directions within the cylinder will oscillate the levers about their pivotal mounting and actuate the jaws toward and from the chuck axis.

A feature of importance of the invention is that a bearing member may be provided for each of the chuck jaws mounted for oscillatory movement in the piston and within each of which a lever may slide, there being pressure tight seals between the periphery of the bearing members and the surfaces of the piston and between the inner surface of the bearing members and the cylindrical surface of the levers.

Another essential feature of the invention is that sealing means are between the outer and inner surfaces of the piston and the cylinder walls, and between the chuck jaws and walls of the chuck body to prevent escape of fluid pressure from either end of the cylinder or past the jaws.

And finally it is an object of the invention to provide an annular piston to permit a relatively large opening through the chuck co-axial with the axis of rotation of the spindle on which the chuck is mounted to accommodate work of large diameter.

With the above and other objects in view the invention may include the features of construction and operation set forth in the following specification and illustrated in the accompanying drawing.

In the accompanying drawing annexed hereto and forming a part of this specification, I have shown the invention embodied in a chuck for bar stock mounted on the headstock spindle of a lathe but it will be understood that the invention can be otherwise embodied and that the drawing is not to be construed as defining or limiting the scope of the invention, the claims appended to this specification being relied upon for that purpose.

Figure 2:
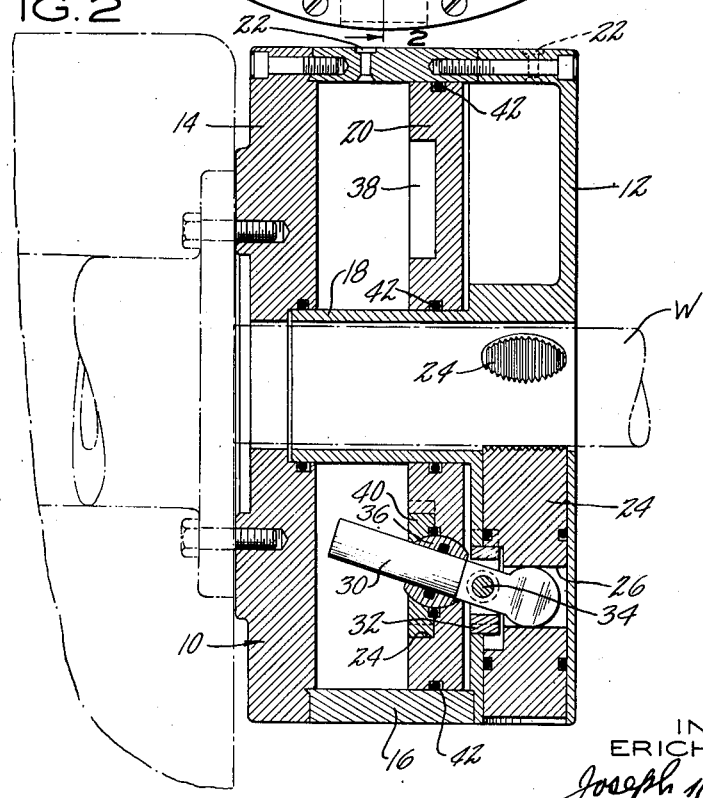

In the drawing:

Fig. 1 is a front elevation of a chuck made in accordance with the present invention, and Fig. 2 is a central longitudinal sectional view of the chuck taken on line 2—2 of Fig. 1.

In the above mentioned drawing, there has been shown but one embodiment of the invention which is now deemed preferable, but it is to be understood that changes and modifications may be made within the scope of the appended claims without departing from the spirit of the invention.

Briefly, and in its broadest aspect, the invention may include the following principal parts: First, a chuck body member in the form of a cylinder adapted to be mounted on the rotatable spindle of a lathe or other machine tool; second, a piston of annular form slidable within the cylinder and engaging a central hollow hub portion of the body member; third, radially movable work clamping jaws mounted within one end of the body member; fourth, levers, one for each jaw pivotally mounted within one of the heads of the cylinder each of which engages a jaw; fifth, oscillating bearing members mounted in the piston, each slidably engaging one of the ends of the levers; sixth, sealing means to prevent the escape of fluid under pressure from said cylinder; and seventh, means to admit fluid under pressure to the cylinder on opposite sides of the piston.

Referring more in particular to the figures of the drawing and first to Figure 2, it will be seen that a cylinder is provided within the body member 10 of the chuck. One of the cylinder heads 12 which forms the front or face member of the chuck is adapted for housing the radially movable jaws and the opposite head 14 is adapted for attachment to one end of a rotatable work or tool spindle for rotation co-axially therewith. A sleeve 16 is attached between the cylinder heads 12 and 14 to form the cylinder for the chuck, the jaw receiving head 12 forming the front or face mmeber of the chuck being secured to the sleeve 16 in any desired way. The front cylinder head 12 has a central hub portion 18 extending to and entering a recessed portion of the opposite head member 14. The hub extension 18 as shown is hollow and the cylinder head 14 into which it enters has a central or axial opening so that there is a large opening extending axially through the chuck for the accommodation of rods and bars of large diameter to be worked on.

Slidable within the sleeve member 18 and in engagement with the outer cylindrical surface of the hub 18 is a piston 20 of annular form. To move the piston 20 within its cylinder fluid such as air under pressure may be admitted to the cylinder on opposite sides of the piston through suitable admitting means 22 formed respectively in the sleeve and front member adjacent the ends of the cylinder.

Radially movable within the front member 12 are work clamping jaws 24, three being shown in the annexed drawing, directly engaging the surface of a work piece W in the form of a rod or bar passing through the chuck 10 and spindle on which the chuck is mounted. At an intermediate part of the jaws 24 are formed transverse slots 26 for a purpose presently to be described.

Pivotally supported within the front member 12 of the chuck body and adjacent each jaw 24 is a lever 30. The forward end of each lever 30 is provided with a cylindrical surface adapted to fit between the inner and outer surfaces of the transverse slots 26 in the jaws 24. To pivotally support the levers 30 a small block 32 as shown in Fig. 2 one for each lever is housed and secured in fixed positions within arcuate recesses formed in the rear face of the front member 12. Within each block 32 is a transverse stud 34 forming the pivot for its lever 30. The block member 32 may be secured in fixed position in member 12 by any suitable means not shown. Oscillation of the levers 30 about their pivots 34 will radially and individually move their jaws 24 to clamp or unclamp a work piece W.

In order to oscillate the levers 30 simultaneously about their pivots 34 to move the jaws to clamping or unclamping positions the rear ends of the levers 30 slidably engage bearing members 36 mounted within the piston 20. The outer surfaces of the bearing members 36 are spherical and each has a central hole extending therethrough slidably engaging the end of a lever 30. As shown in Fig. 2 portions of the outer spherical surface of the bearing members 36 may be cut away. To retain the bearing members 36 in fixed position but freely oscillable in the piston, the following construction is used. An annular groove 38 may be cut into the rear surface of the piston 20. Semi-spherical surfaces in the piston 20 may be provided one for each lever 30. Enclosing the rear half of the bearing member 36 is a plate 40 recessed spherically to fit the member 36 and having an opening through which the end of a lever 30 may pass. The radial position in the piston 20 of the bearing members 36 is such that the levers 30 are oscillated by movement of the piston from one end of the cylinder to the other. Movement of the piston 20 from the postion shown in Fig. 2 will oscillate each lever in a direction to force the jaws radially inward to clamping position. The pressure of the force acting on the jaws 24 will be increased as the piston moves to the left due to the lengthening of the distance between the pivots 34 for the levers 30 and the point on the lever engaged by the bearing member 36. The piston 20 when moved from one position to another will be retained in that position due to the self-locking action of the levers 30 against the piston 20. In clamped position of the jaws 24 the levers 30 will be brought more nearly parallel to the axis of rotation of the chuck 10 and to the direction of movement of the piston 20 thus increasing the self-locking effect.

To seal the fluid admitted to the cylinder on opposite sides of the piston 20 and to prevent escape therefrom, sealing rings of compressive material such as rubber or Neoprene may be used. The inner and outer peripheries of the piston 20 may have small grooves cut therein in which are placed small diameter sealing rings 42. A similar ring may be placed within a groove in the central opening of the head 14 in contact with the end of the hub extension 18. Also similar rings may be placed in suitable grooves to prevent escape of fluid past the bearing member 36 and past the jaws 24 on opposite sides of the transverse slot.

I claim as my invention:

1. A chuck comprising a body member, a cylinder therein, a piston slidable within said cylinder, fluid means to actuate said piston, radially movable jaws mounted adjacent one end of said body member and levers pivotally mounted within the body member adjacent said jaws and operatively engaging said jaws at one end, the opposite ends of said levers slidably engaging said piston along their length, whereby movement of said piston will oscillate said levers and radially actuate said jaws.

2. A chuck comprising a body member, a cylinder therein, a piston slidable within said cylinder, radially movable jaws mounted adjacent one end of said body member, levers pivotally mounted within the body member adjacent said jaws and operatively engaging said jaws at one end, and bearing members housed within said piston, the opposite ends of said levers slidably engaging said bearing members, whereby movements of said piston will oscillate said levers and bearing members and radially actuate said jaws.

3. A chuck comprising a body member, a cylinder therein, a piston slidable within said cylinder, radially movable jaws mounted adjacent one end of said body member, levers pivotally mounted within said body member, and operatively engaging said jaws at one end, the opposite ends of said levers slidably engaging said piston along their length, means to admit fluid under pressure to opposite ends of said cylinder, and sealing means to prevent escape of fluid from said cylinder past said levers.

4. A chuck comprising a body member, a cylinder therein, a piston slidable within said cylinder, radially movable jaws mounted adjacent one end of said body member, levers pivotally mounted within said body member, and operatively engaging said jaws at one end, the opposite ends of said levers slidably engaging said piston, means to admit fluid under pressure to opposite ends of said cylinder, compressive sealing rings between piston and cylinder and between said piston and levers to prevent escape of fluid from said cylinder and past said levers.

5. A chuck comprising a body member, a cylinder therein, a piston slidable within said cylinder, fluid means to move said piston within said cylinder, radially movable jaws mounted adjacent one end of said body members, means interconnecting said jaws and piston whereby movement of said piston away from said jaws will actuate said jaws in a clamping direction at an increasing leverage.

6. A chuck comprising a body member, a cylinder therein, a piston slidable within said cylinder, fluid means to move said piston within said cylinder, radially movable jaws mounted adjacent one end of said body member, means interconnecting said jaws and piston whereby movement of said piston away from said jaws will actuate said jaws in a clamping direction at an increasing pressure and said piston will be self-locked in its work clamping position.

7. A chuck comprising a body member having spaced heads forming a cylinder between them, means on one head to attach the chuck to a spindle, radially movable jaws mounted in the opposite head, a hollow hub extending axially from one of said heads toward the opposite head, an annular piston within said cylinder surrounding said hub, and levers pivotally mounted within one of said heads between said piston and jaws whereby movement of said piston will slidably engage said levers along their length and radially actuate said jaws.

8. A chuck comprising a body member having spaced heads forming a cylinder between them, means on one head to attach the chuck to a spindle, radially movable jaws mounted in the opposite head, a hollow hub extending axially from one of said heads toward the opposite head, an annular piston within said cylinder surrounding said hub, interconnecting means between said piston and jaws whereby movement of said piston will actuate said jaws, and sealing means for said piston and said interconnecting means.

9. A chuck comprising a body member having spaced heads, means on one head to attach the chuck to a spindle, radially movable jaws mounted in the opposite head, a hollow hub extending co-axially of said chuck from one head to the other head, an annular member mounted between said heads and slidable on said hub, interconnecting lever means between said jaws and slidable member whereby movement of said slidable member will engage said levers along their length and actuate said jaws, and fluid power means to actuate said slidable member.

10. A chuck comprising a body member having spaced heads, means on one head to attach the chuck to a spindle, radially movable jaws mounted in the opposite head, a hollow hub extending co-axially of said chuck from one head to the other head, an annular member mounted between said heads and slidable on said hub, levers pivotally mounted intermediate their length in one of said heads, said levers having one end connected to a jaw, the opposite ends of said levers being connected to said slidable member whereby movement of said slidable member will operate said jaws, and actuating means for said slidable member.

References Cited in the file of this patent

UNITED STATES PATENTS

| Number | Name | Date |
|---|---|---|
| 1,116,838 | Oster et al. | Nov. 10, 1914 |
| 1,406,451 | Elvers | Feb. 14, 1922 |
| 2,573,403 | Church | Oct. 30, 1951 |